(12) United States Patent
Bales et al.

(10) Patent No.: US 12,346,901 B1
(45) Date of Patent: Jul. 1, 2025

(54) MOBILE COMMUNICATION DEVICE IN-KIND PAYMENT VERIFICATION

(71) Applicant: T-Mobile Innovations LLC, Overland Park, KS (US)

(72) Inventors: Mark R. Bales, Lee's Summit, MO (US); Craig A. Lee, Overland Park, KS (US); Alberto Lorente, Kansas City, MO (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 926 days.

(21) Appl. No.: 15/844,496

(22) Filed: Dec. 15, 2017

(51) Int. Cl.
*G06Q 20/40* (2012.01)
*G01S 5/00* (2006.01)
(Continued)

(52) U.S. Cl.
CPC .......... *G06Q 20/401* (2013.01); *G01S 5/0027* (2013.01); *G06Q 20/3223* (2013.01);
(Continued)

(58) Field of Classification Search
CPC .. G06Q 20/223; G06Q 20/3224; G06Q 20/40; H04B 5/00; H04M 1/72552; H04W 12/00503; H04W 4/029; G01S 5/0009
See application file for complete search history.

(56) References Cited

U.S. PATENT DOCUMENTS 7,764,946 B1 * 7/2010 Sennett .................. H04W 4/90
455/404.1
8,176,431 B1 * 5/2012 Scannell ............ G06Q 30/0643
715/762
(Continued)

FOREIGN PATENT DOCUMENTS

WO  WO-2013071425 A1 * 5/2013 .............. H04W 4/14
WO       2014108762 A1    7/2014

OTHER PUBLICATIONS

F. S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC.2009.40. (Year: 2009).*

(Continued)

*Primary Examiner* — Neha Patel
*Assistant Examiner* — Jahed Ali (57) ABSTRACT

A mobile communication device. The device comprises a processor, a non-transitory memory, a cellular radio transceiver, and an in-kind payment client application stored in the non-transitory memory. When executed by the processor, the client application initiates an in-kind payment from a first wireless communication service account that is associated with the mobile communication device to a second wireless communication service account associated with a second mobile communication device, sends a verification request message to the second mobile communication device, receives an in-kind payment verification response message from the second mobile communication device, where the response message comprises an indication of a location of the second mobile communication device and an indication of completion of an in-kind payment to the second wireless communication service account, and analyzes the indication of location of the second mobile communication device and the indication of completion of the in-kind payment.

9 Claims, 8 Drawing Sheets

(51) Int. Cl.
  *G06Q 20/32* (2012.01)
  *H04W 4/02* (2018.01)
  *H04W 24/10* (2009.01)

(52) U.S. Cl.
  CPC ....... *G06Q 20/325* (2013.01); *G06Q 20/3278* (2013.01); *H04W 4/02* (2013.01); *H04W 24/10* (2013.01)

(56) References Cited

U.S. PATENT DOCUMENTS

| | | | |
|---|---|---|---|
| 8,873,589 B2 | 10/2014 | Aweya et al. | |
| 9,448,308 B2 | 9/2016 | Burroughs et al. | |
| 9,465,650 B2 | 10/2016 | Meng et al. | |
| 9,699,606 B1* | 7/2017 | Bhatia | G06Q 10/0833 |
| 10,251,053 B1* | 4/2019 | Paczkowski | H04W 8/22 |
| 10,650,123 B2 | 5/2020 | Mintz et al. | |
| 2006/0123117 A1 | 6/2006 | Heutchy et al. | |
| 2011/0101095 A1 | 5/2011 | Bales, Jr. et al. | |
| 2011/0184640 A1* | 7/2011 | Coleman | G01C 21/00 |
| | | | 701/533 |
| 2011/0196797 A1* | 8/2011 | Liwerant | G06Q 20/06 |
| | | | 705/71 |
| 2011/0238513 A1* | 9/2011 | Naccache | H04W 12/06 |
| | | | 705/18 |
| 2012/0116957 A1* | 5/2012 | Zanzot | G06Q 20/10 |
| | | | 705/39 |
| 2012/0209732 A1* | 8/2012 | Jeong | G06Q 20/42 |
| | | | 705/17 |
| 2012/0239572 A1 | 9/2012 | Wolfs et al. | |
| 2012/0252489 A1* | 10/2012 | Meredith | G01S 5/0252 |
| | | | 455/456.1 |
| 2012/0316963 A1* | 12/2012 | Moshfeghi | G06Q 20/327 |
| | | | 705/14.58 |
| 2013/0036000 A1* | 2/2013 | Giordano | G06Q 40/02 |
| | | | 705/14.27 |
| 2013/0091452 A1* | 4/2013 | Sorden | G06N 5/04 |
| | | | 715/771 |
| 2014/0025576 A1* | 1/2014 | Esch | G06Q 20/325 |
| | | | 705/44 |
| 2014/0129428 A1* | 5/2014 | Tyler | G06Q 20/3226 |
| | | | 705/39 |
| 2014/0279123 A1* | 9/2014 | Harkey | G06Q 50/10 |
| | | | 705/26.1 |
| 2014/0279518 A1* | 9/2014 | Acuna-Rohter | G06Q 20/40 |
| | | | 705/44 |
| 2014/0310126 A1* | 10/2014 | Baazov | H04W 48/04 |
| | | | 705/26.25 |
| 2014/0310240 A1 | 10/2014 | Meng et al. | |
| 2015/0039506 A1 | 2/2015 | Groarke et al. | |
| 2015/0161585 A1* | 6/2015 | Huster | G06Q 20/3224 |
| | | | 705/44 |
| 2015/0382137 A1* | 12/2015 | Prehn | H04W 4/029 |
| | | | 705/39 |
| 2016/0092872 A1* | 3/2016 | Prakash | G06Q 20/3829 |
| | | | 705/65 |
| 2016/0092988 A1 | 3/2016 | Letourneau | |
| 2016/0252576 A1 | 9/2016 | Tofighbakhsh et al. | |
| 2016/0283884 A1* | 9/2016 | Wilson | H04L 67/306 |
| 2017/0091699 A1* | 3/2017 | Mueller | G06Q 10/083 |
| 2017/0193505 A1* | 7/2017 | Erhart | G06Q 50/01 |
| 2017/0207988 A1 | 7/2017 | Li et al. | |
| 2017/0214573 A1 | 7/2017 | Linsky et al. | |
| 2017/0243215 A1 | 8/2017 | Sifford et al. | |
| 2017/0323294 A1 | 11/2017 | Rohlfing et al. | |
| 2018/0192297 A1* | 7/2018 | Chadaga | H04W 52/242 |
| 2019/0182614 A1* | 6/2019 | Monogioudis | G01S 5/0294 |
| 2019/0355015 A1* | 11/2019 | Dashevskiy | H04W 4/23 |
| 2019/0392119 A1 | 12/2019 | Rahiman et al. | |
| 2021/0168567 A1* | 6/2021 | Mouline | H04W 4/06 |

OTHER PUBLICATIONS

Bales, Mark R., et al., "Block Chain Recordation of In-Kind Payments," filed Dec. 15, 2017, U.S. Appl. No. 15/844,500.
Final Office Action dated Oct. 1, 2020, U.S. Appl. No. 15/844,500, filed Dec. 15, 2017.
FAIPP Pre-Interview Communication dated Mar. 3, 2020, U.S. Appl. No. 15/844,500, filed Dec. 15, 2017.
FAIPP Office Action dated May 22, 2020, U.S. Appl. No. 15/844,500, filed Dec. 15, 2017.
Advisory Action dated Dec. 17, 2020, U.S. Appl. No. 15/844,500, filed Dec. 15, 2017.
Office Action dated Jul. 23, 2021, U.S. Appl. No. 15/844,500, filed Dec. 15, 2017.
Final Office Action dated Dec. 9, 2021, U.S. Appl. No. 15/844,500, filed Dec. 15, 2017.
Notice of Allowance dated Jun. 9, 2022, U.S. Appl. No. 15/844,500, filed Dec. 15, 2017.

* cited by examiner

MOBILE COMMUNICATION DEVICE IN-KIND PAYMENT VERIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some wireless communication service providers support in-kind payments from a first wireless communication subscription account to a second wireless communication subscription account. Sometimes the in-kind payment can be made from a subscription account with a first wireless communication service provider to a different subscription account with a second wireless communication service provider, for example where the first wireless communication service provider provides communication services in a first nation and the second wireless communication service provider provides communication services in a second nation. This may involve the first wireless communication service provider and the second wireless communication service provider having methods for transferring money between escrow accounts. In-kind payments may involve topping up pre-paid communication service balances or post-paid communication service balances, which may be referred to in some contexts as airtime remittances.

SUMMARY

In an embodiment, a method of verifying in-kind payment from a first wireless communication service account to a different wireless communication service account is disclosed. The method comprises initiating an in-kind payment by a first mobile communication device from a first wireless communication service account with a first wireless communication service provider that is associated with the first mobile communication device to a second wireless communication service account with a second wireless communication service provider that is associated with a second mobile communication device and sending an in-kind payment verification request message from a client application executing on the first mobile communication device to a client application executing on the second mobile communication device. The method further comprises receiving an in-kind payment verification response message by the client application executing on the first mobile communication device from the client application executing on the second mobile communication device, where the response message comprises an indication of a location of the second mobile communication device and an indication of completion of an in-kind payment to the second wireless communication service account and analyzing by the client application executing on the first mobile communication device the indication of location of the second mobile communication device and the indication of completion of the in-kind payment to the second wireless communication service account, whereby the client executing on the first mobile communication device verifies the in-kind payment.

In another embodiment, a method of verifying in-kind payment from a first wireless communication service account to a different wireless communication service account is disclosed. The method comprises receiving an in-kind payment initiation message from a first mobile communication device associated with a first wireless communication service account by an application executing on a computer system, wherein the in-kind payment initiation message indicates a value of in-kind payment, a recipient of in-kind payment, and a cell site to which the first mobile communication device is wirelessly linked and determining a cell site to which a second mobile communication device associated with the recipient of in-kind payment is wirelessly linked by the application. The method further comprises determining by the application whether the cell site to which the first mobile communication device is wirelessly linked is within a customary operation region of the first mobile communication device, determining whether the cell site to which the second mobile communication device is wirelessly linked is within a customary operation region of the second mobile communication device, and, based on the cell site to which the first mobile communication device is wirelessly linked being within the customary operation region of the first mobile communication device and based on the cell site to which the second mobile communication device is wirelessly linked being within the customary operation region of the second mobile communication device, transferring an in-kind payment by the application from the first wireless communication service account to the second wireless communication service account.

In yet another embodiment, a mobile communication device is disclosed. The mobile communication device comprises a processor, a non-transitory memory, a cellular radio transceiver, and an in-kind payment client application stored in the non-transitory memory. When executed by the processor, the in-kind payment client application initiates an in-kind payment from a wireless communication service account with a first wireless communication service provider that is associated with the mobile communication device to a second wireless communication service account with a second wireless communication service provider that is associated with a second mobile communication device and sends an in-kind payment verification request message via the cellular radio transceiver to a client application executing on the second mobile communication device. The in-kind payment client application further receives an in-kind payment verification response message from the client application executing on the second mobile communication device, where the response message comprises an indication of a location of the second mobile communication device and an indication of completion of an in-kind payment to the second wireless communication service account and analyzes the indication of location of the second mobile communication device and the indication of completion of the in-kind payment to the second wireless communication service account, whereby the in-kind payment client application verifies the in-kind payment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for verifying in-kind payments in wireless communication service accounts is taught herein. As used herein, an in-kind payment refers to a payment or transfer of payment in the form of a good rather than in the form of money or cash, where the good specifically is a communication service or a balance in a communication service account. While the balance in a communication service account that received an in-kind payment may be represented in a currency amount, this currency amount can only be used to pay for communication services and cannot be converted to currency and removed from the communication service account. A person using a mobile communication device may transfer value from his or her post-paid wireless communication service account to a wireless communication service account with a different wireless communication service provider, possibly with a service provider located in a different country. For example, a young man in the United States may transfer in-kind payment from his wireless communication service account in the US to his mother's wireless communication service account in Mexico. But existing in-kind payment systems may not provide for verifying that the in-kind payment has been completed successfully or that the in-kind payment goes to the right mobile communication device or right service account. Alternatively, the in-kind payment may be transferred from the sender's post-paid wireless communication service account to another third party (e.g., not a wireless communication service provider) that is a trusted financial institution or mediator, and the third party may then transfer the in-kind payment to the wireless communication service account of the receiver or to a different financial account of the receiver, such as to an electric utility bill account of the receiver, to a gas utility bill account of the receiver, to a water utility bill account of the receiver, or other account of the receiver.

In-kind payments in wireless communication service accounts may be vulnerable to identity theft or other fraud. For example, a first mobile communication device spoofing a legitimate device may authorize transfer of in-kind payment from a wireless communication service account associated with the legitimate device to a second service account of a second mobile communication device, and the transferred in-kind payment may then be liquidated out of the second service account to prevent recovery of the fraudulently transferred in-kind payment. This kind of in-kind payment fraud can be repeated over and over again many times before the fraud comes to the attention of the subscriber associated with the legitimate device. Detecting this fraud, stopping the fraud, and possibly recovering fraudulently transferred in-kind payments is complicated when the in-kind payment is made from a subscription service account with a first wireless communication service provider to a subscription service account with a second different wireless communication service provider and may be complicated yet further when the first and second wireless communication service providers are located and operate in different countries. Additionally, the subscriber himself or herself may accidently key in the wrong phone number of a destination of an in-kind payment and not realize the error until the in-kind payment has been transmitted to an unintended recipient and may then be unrecoverable. On the other end, the intended recipient, for example the subscribers mother, may be waiting for arrival of the in-kind payment and be making plans on the assumption the in-kind payment will take place as expected. When the in-kind payment does not happen, this can be a hardship for the expectant intended recipient.

An in-kind payment client application executing on a mobile communication device may provide in-kind payment verification functionality. The user may execute the client application to designate the amount of in-kind payment to be transacted and to designate the receiving mobile communication device and/or receiving service account. This client application can interact with the wireless communication service provider of that user, or to a third party mediator, to initiate the in-kind payment transaction. After launching the in-kind payment, the client application can directly communicate with the receiving mobile communication device and request that receiving mobile communication device to send an indication of its current location and to send confirmation that the in-kind payment has indeed been registered to the service account of that receiving mobile communication device. The client application executing on the sending device can receive a message from the recipient client application and display both the current location of the recipient mobile communication device and the status of the deposit of the in-kind payment in the appropriate account. If the sender expects the receiving device to be in Mexico City but instead the indication is that the device is in Veracruz or in Prague, the sender can contact his or her wireless communication service provider to report an incident of fraud. In an embodiment, the client application on the in-kind payment sender may send a silent short message service (SMS) to the in-kind payment receiver device, and this silent SMS may trigger the in-kind payment client application on the receiver device to execute. This functionality can help prevent fraud and can enable more rapid identification of an instance of fraud, which if promptly reported may help the wireless communication service provider to identify the fraud mechanism and deploy countermeasures to reduce such fraud in the future.

The sender in-kind payment client application and the receiver in-kind payment client application may exchange information with each other independently of verification of in-kind payment transactions. For example, the payment client applications may collect information on customary cell sites that its host mobile communication device receives wireless coverage from and may periodically send a message identifying these customary cell sites. A list of identities of customary cell sites may be used by a sending in-kind payment application to verify that the receiver mobile communication device is where it is expected to be. Thus, if mom is expected to be in Kansas City, Missouri (or receiving wireless coverage from one of a plurality of cell sites located in and close to Kansas City) but the identity of the cell site returned by the receiver in-kind client application does not match any customary cell site identity, the sender may reasonably suspect some kind of fraud is taking place. This information about customary cell sites may be stored by an in-kind payment client application in a data store along with like, but distinguished, information stored by other in-kind payment client applications executing on different mobile communication devices in the same data store.

In an embodiment, an in-kind payment application executing on a server computer in a wireless communication service provider's core network may add further verification on top of the verification provided by in-kind payment client applications described above. The in-kind payment application executing on the server can determine the identity of the cell site to which the sending mobile communication device is wirelessly coupled to and determine if this is a customary or expected cell site for the device to receive wireless coverage from. If the cell site is unexpected, the in-kind payment application executing on the server computer can halt the in-kind payment transaction. In this case, the server may reach out to the subscriber and request further authentication from the user, for example presentation of a biometric via the in-kind payment client application and mobile device or presentation of a personal identification number and/or password. The in-kind payment application executing on the server can likewise determine the identity of the cell site to which the recipient mobile communication device is attached and verify that this cell site identity is an expected identity.

In an embodiment, in-kind payments by mobile phone devices may be recorded using block chain technology. For further details on verification of in-kind payment by mobile communication devices see U.S. patent application Ser. No. 15/844,500 filed Dec. 15, 2017, entitled "Block Chain Recordation of In-kind Payments," by Mark R. Bales, et al., which is incorporated herein by reference in its entirety.

Figure 1:
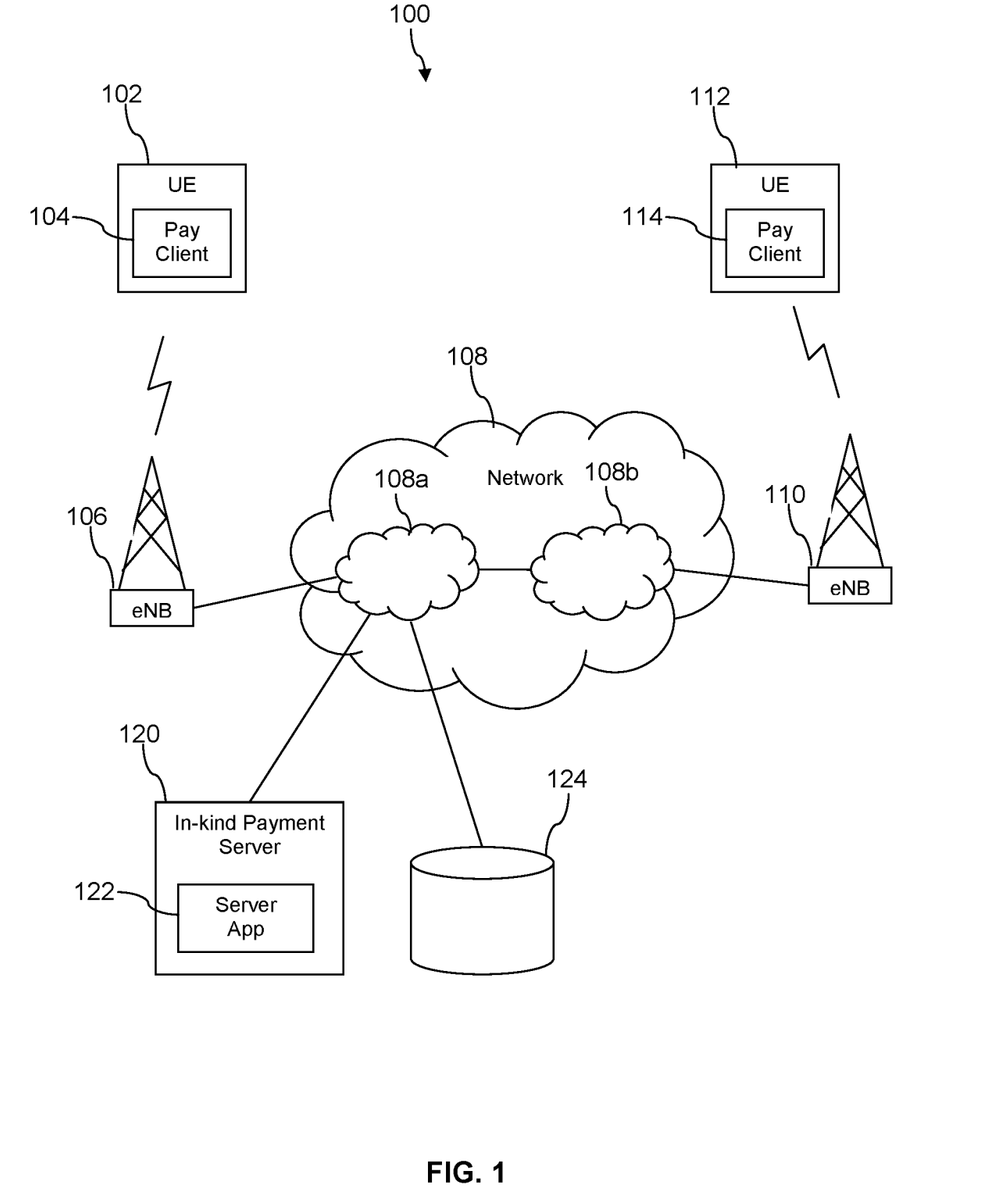
- FIG. 1 is a block diagram of a communication system according to an embodiment of the disclosure.

Turning now to FIG. 1, a communication system 100 is described. In an embodiment, the system 100 comprises a first mobile communication device (user equipment [UE]) 102 that executes a first in-kind payment client application 104 and that receives a wireless communication link from a first cell site 106. The first mobile communication device 102 may be a mobile phone, a smart phone, a personal digital assistant (PDA), a headset computer, a wearable computer, a laptop computer, a notebook computer, a tablet computer, or other mobile communication device. The first cell site 106 may provide a wireless link to the first device 102 according to a long term evolution (LTE), a code division multiple access (CDMA), a global system for mobile communication (GSM), or a worldwide interoperability for microwave access (WiMAX) wireless communication protocol. The first cell site 106 may communicatively couple the first mobile communication device 102 to a network 108. The network 108 comprises one or more public networks, one or more private networks, or a combination thereof. In an embodiment, the network 108 comprises a first communication network 108a operated by a first wireless communication service provider and a second communication network 108b operated by a second, different wireless communication service provider. The first cell site 106 may be communicatively coupled to the network 108 specifically by a communication connection to the first communication network 108a. In an embodiment, the first communication network 108a is located in a first country and the second communication network 108b is located in a second, different country.

The system 100 further comprises a second mobile communication device (UE) 112 that executes a second in-kind payment client application 114 and that receives a wireless communication link from a second cell site 110. The second mobile communication device 112 may be a mobile phone, a smart phone, a personal digital assistant (PDA), a headset computer, a wearable computer, a laptop computer, a notebook computer, a tablet computer, or other mobile communication device. The second cell site 110 may provide a wireless link to the second device 112 according to a long term evolution (LTE), a code division multiple access (CDMA), a global system for mobile communication (GSM), or a worldwide interoperability for microwave access (WiMAX) wireless communication protocol. The second cell site 110 may communicatively couple the second mobile communication device 112 to the network 108. In an embodiment, the second cell site 110 may be communicatively coupled to the network 108 specifically by a communication connection to the second communication network 108b.

The user of the first device 102 may initiate an in-kind payment from a first wireless communication service account associated with the first device 102 to a second wireless communication service account associated with the second device 112. This may involve a transfer of value from a first wireless communication service provider that operates the first communication network 108a to a second wireless communication service provider that operates the second communication network 108b, for example debiting the first wireless communication service account controlled by the first wireless communication service provider and crediting the second wireless communication service account controlled by the second wireless communication service provider. This in-kind payment transaction may pass from the first wireless communication service provider to a third party mediator or trusted financial institution, and from the third party mediator to the second wireless communication service provider or to another financial account associated with the user of the second mobile communication device 112, for example to an electric utility account, to a gas utility account, to a water utility account, or some other service account.

To make an in-kind payment, the user may interact with the first in-kind payment client application 104 that executes on the first device 102. The user may provide inputs to the first in-kind payment client application 104 that identifies a recipient of the in-kind payment as the second mobile communication device 112 (or the second wireless communication service account associated with the second device 112) and identifies an amount of in-kind payment. The user of the first device 102 may key in a telephone number of the second device 112. Alternatively, the user of the first device 102 may select an entry in a contacts list of the first device 102 which designates the second device 112.

The user may further provide an input identifying what form of in-kind payment to complete from among a plurality of different possible in-kind payments. For example, an in-kind payment may be a transfer of credit to a standard wireless communication service account (e.g., for standard voice and standard data wireless communication service, also known as an airtime remittance), a transfer of credit to a pay-per-view video service, a transfer of credit to a premium communication service (e.g., a right to access premium communication service such as live streaming of World Cup Soccer games), or other. An in-kind payment may be identified as a payment to an electric utility account, to a gas utility account, to a water utility account, to a credit card account, to a grocery bill account.

The first in-kind payment client application 104 may then send an in-kind payment request message to an in-kind payment server 120 that executes an in-kind payment server application 122, where the in-kind payment server 120 is communicatively connected to the first communication network 108*a* and controlled by the first wireless communication service provider. The in-kind payment server application 122 may interwork with the second wireless communication service provider to transfer value to the second wireless communication service account associated with the second device 112. Alternatively, the in-kind payment server application 122 may interwork with a third party mediator to transfer value to the third party mediator, and the third party mediator may then transfer value to the second wireless communication service account or to some other utility account or financial account associated with the user of the second device 112.

The transfer of in-kind payments, however, may be vulnerable to hacking and/or identity theft. To reduce the risk of in-kind payment fraud, the first in-kind payment application 104 executing on the first device 102 may exchange messages with the second in-kind payment application 114 executing on the second device 112. For example, the first in-kind payment client application 104 can send a message to the second device 112 requesting an indication of the location of the second device 112 and confirmation of the crediting of an in-kind payment to the second wireless communication service account associated with the second device 112. In an embodiment, the first in-kind payment client application 104 may send a silent SMS or system SMS message to the second device 112, and the second in-kind payment client application 114 may be launched in response to the second device 112 receiving the silent SMS or system SMS. The second in-kind payment client application 114 can capture information about its location, check its account balance, bundle an indication of its location and information about its account balance (e.g., a current account balance or a change in account balance over a recent period of time) in a reply message, and send this reply message to the first in-kind payment client application 104. The first in-kind payment client application 104 can present information on a display of the first device 102 for the user to review. If the account balance of the second device 112 has been credited or incremented accordingly and if the indication of the location of the second device 112 is consistent with expectations, the user can feel assured the in-kind payment transaction completed properly. If anything is awry, however, the user can follow-up with the first wireless communication service provider. In this way, fraud involving in-kind payment transactions can be detected promptly and action taken to un-wind the fraud and prevent continued fraud going forwards.

The indication of location may be provided as a name of a town. The indication of location may be provided as GPS coordinates, and the first in-kind payment client application 104 may translate the GPS coordinates to a town name or location name. The indication of location may be provided as an identity of the second cell site 110 which is providing the second device 112 a wireless communication link. In an embodiment, the first in-kind payment client application 104 may be able to look-up the town name or location name associated with the identity of the second cell site 110 in a data store 124. Alternatively, the second in-kind payment client application 114 may build a list of identities of cell sites 110 that it connects to frequently and send these to the first client application 104, for example once per week, once per week, once per quarter, or on some other basis. In this way, the first in-kind payment client application 104 can develop a list of customary or common cell sites 110 used by the second device 112, and the first client application 104 can then determine if the identity of the cell site 110 returned by the second in-kind payment client application 114 in a reply message is a "customary" cell site identity. When a fraud is practiced, the identity of the cell site 110 returned by the second in-kind payment client application 114 in a reply message may not be a customary cell site identity and hence may elicit doubts on the part of the user of the first device 102 and stimulate him or her to inquire further into the in-kind payment transaction.

Figure 2:
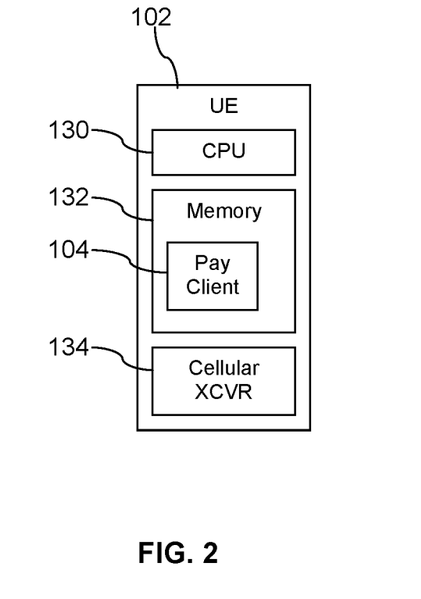
FIG. 2 is a block diagram of a mobile communication device according to an embodiment of the disclosure.

Turning now to FIG. 2, further details of the first mobile communication device 102 are described. The first device 102 comprises a processor 130, a non-transitory memory 132, and a cellular radio transceiver 134. The first in-kind payment client application 104 is stored in the non-transitory memory 132 and may be executed by the processor 130. The second device 112 may have a structure similar to that illustrated and described with reference to FIG. 2.

Figure 3:
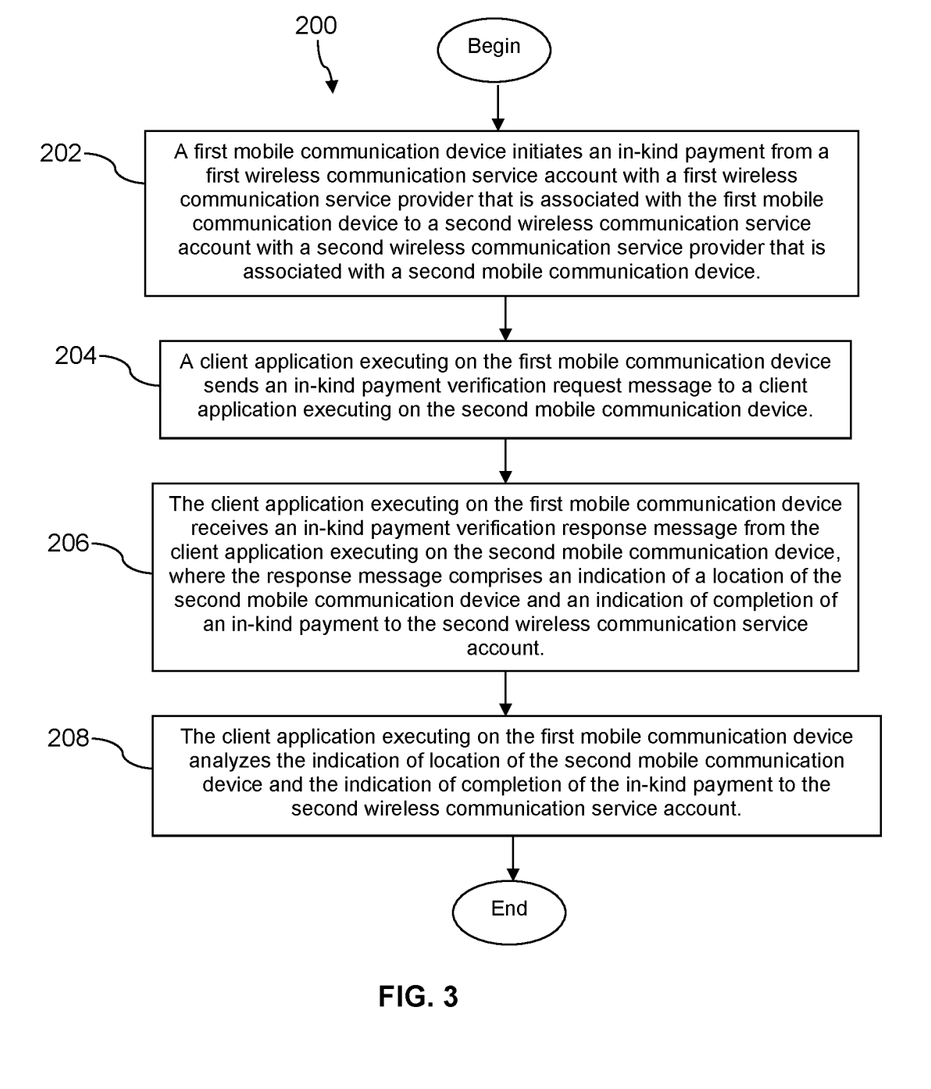
FIG. 3 is a flow chart of a method according to an embodiment of the disclosure.

Turning now to FIG. 3, a method 200 is described. At block 202, a first mobile communication device initiates an in-kind payment from a first wireless communication service account with a first wireless communication service provider that is associated with the first mobile communication device to a second wireless communication service account with a second wireless communication service provider that is associated with a second mobile communication device. Alternatively, the in-kind payment is directed from the first wireless communication service account to a third party mediator. In an embodiment, the first wireless communication service provider operates in a first country and the second wireless communication service provider operates in a second different country.

At block 204, a client application executing on the first mobile communication device sends an in-kind payment verification request message to a client application executing on the second mobile communication device. In an embodiment, the first device sends the in-kind payment verification request message as a silent SMS or a system SMS message to the second device, and the second device responds to the silent SMS message by launching the client application on the second mobile communication device and passing parameters or arguments from the silent SMS message to the client application on the second device.

At block 206, the client application executing on the first mobile communication device receives an in-kind payment verification response message from the client application executing on the second mobile communication device, where the response message comprises an indication of a location of the second mobile communication device and an indication of completion of an in-kind payment to the second wireless communication service account. The location indication may be a name of a city or location of the second device. The location indication may be GPS coordinates of the second device. The location indication may be an identity of a cell site from which the second device is currently receiving a wireless link or wireless coverage. The in-kind payment verification response message may further indicate a value amount of the in-kind payment to the second wireless communication service account. The in-kind payment verification response message may indicate the category of in-kind payment, for example a top-up to a standard wireless communication service account (e.g., airtime remittance), a pay-per-view video account, a premium communication service, a utility account, a financial account, or other category of in-kind payment.

At block 208, the client application executing on the first mobile communication device analyzes the indication of location of the second mobile communication device and the indication of completion of the in-kind payment to the second wireless communication service account. If the location is non-customary or unusual or if the in-kind payment is not indicated as being completed, the client application executing on the first device (e.g., the payment sending device) may send a notification to the user of the first device, for example popping up a notification on the display of the first device. The client application executing on the first device may further send a notification about the situation to an in-kind payment server application executing in the network of the wireless communication service provider of the first device.

A customary cell site may be deemed a cell site that is among the cell sites a mobile communication device receives wireless coverage from at least 80% of the time. For example, if the first mobile communication device receives wireless coverage from a first cell site 25% of the time, from a second cell site 15% of the time, from a third cell site 10% of the time, from a fourth cell site 8% of the time, from a fifth cell site 8% of the time, from a sixth cell site 8% of the time, from a seventh cell site 6% of the time, and from an eighth cell site to a fortieth cell site the remaining 20% of the time, the first, second, third, fourth, fifth, sixth, and seventh cell sites may be considered to be a customary cell site while other cell sites are deemed non-customary cell sites. Other definitions of customary cell sites may be employed in different embodiments. For example, customary cell sites may be deemed a cell site among the cell sites a mobile communication device receives wireless coverage at least 90% of the time, 95% of the time, or some other threshold percentage of time.

Figure 4:
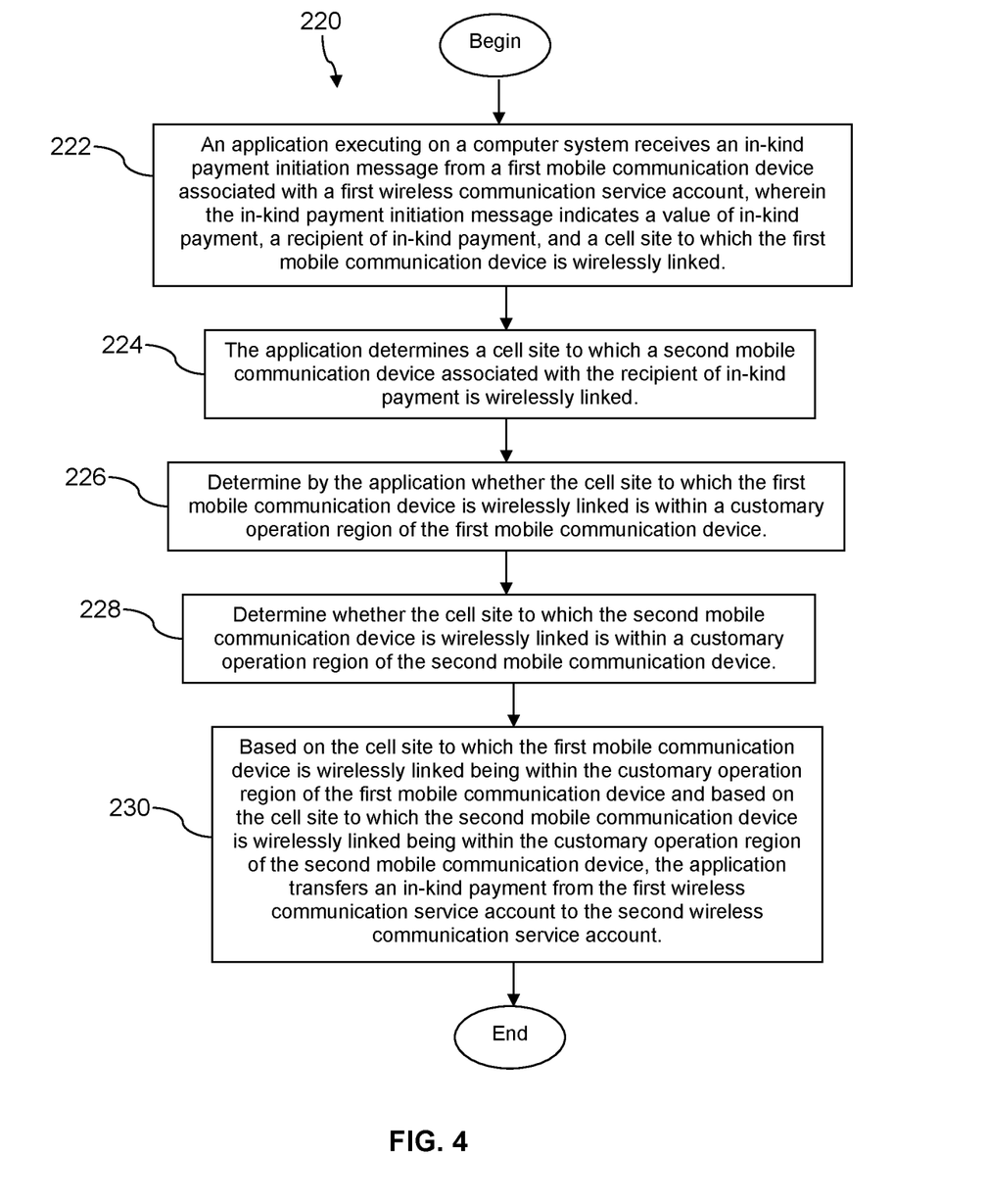
FIG. 4 is a flow chart of another method according to an embodiment of the disclosure.

Turning now to FIG. 4, a method 220 is described. At block 222, an application executing on a computer system receives an in-kind payment initiation message from a first mobile communication device associated with a first wireless communication service account, wherein the in-kind payment initiation message indicates a value of in-kind payment, a recipient of in-kind payment, and a cell site to which the first mobile communication device is wirelessly linked.

At block 224, the application determines a cell site to which a second mobile communication device associated with the recipient of in-kind payment is wirelessly linked. At block 226, determine whether the cell site to which the first mobile communication device is wirelessly linked is within a customary operation region of the first mobile communication device. The application executing on the server computer may perform the processing of block 226. At block 228, determine whether the cell site to which the second mobile communication device is wirelessly linked is within a customary operation region of the second mobile communication device. The processing of block 228 may be performed by the application executing on the server computer. Alternatively, the processing of block 228 may be performed by a client application execution on the first mobile communication device. In an embodiment, the second mobile communication device builds a report of cell sites that it receives wireless coverage from and sends the report back to the first mobile communication device and/or to a data store coupled to the network of the first wireless communication service provider.

At block 230, based on the cell site to which the first mobile communication device is wirelessly linked being within the customary operation region of the first mobile communication device and based on the cell site to which the second mobile communication device is wirelessly linked being within the customary operation region of the second mobile communication device, the application transfers an in-kind payment from the first wireless communication service account to the second wireless communication service account. Alternatively, the application transfers an in-kind payment from the first wireless communication service account to a third party mediator or third party trusted financial institution, and the third party mediator or third party trusted financial institution transfers the in-kind payment to the second wireless communication service account or to a utility account or financial account associated with a user of the second mobile communication device.

Figure 5:
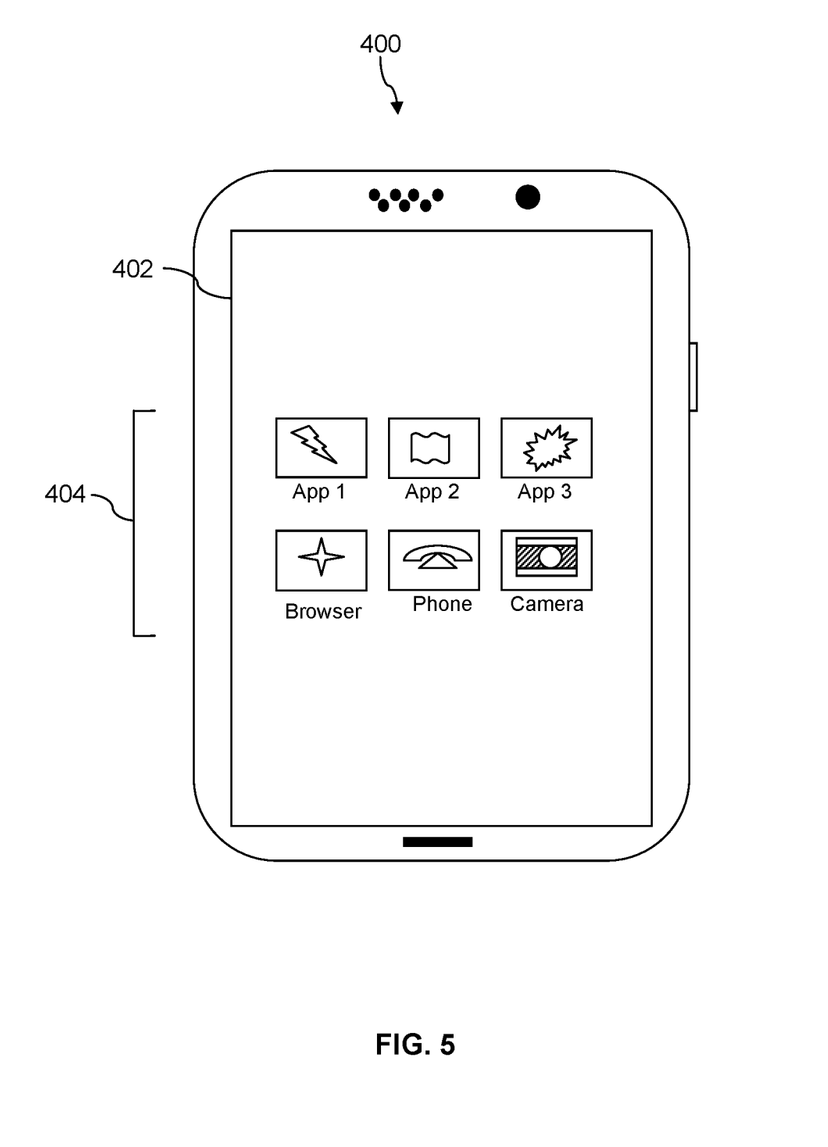
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
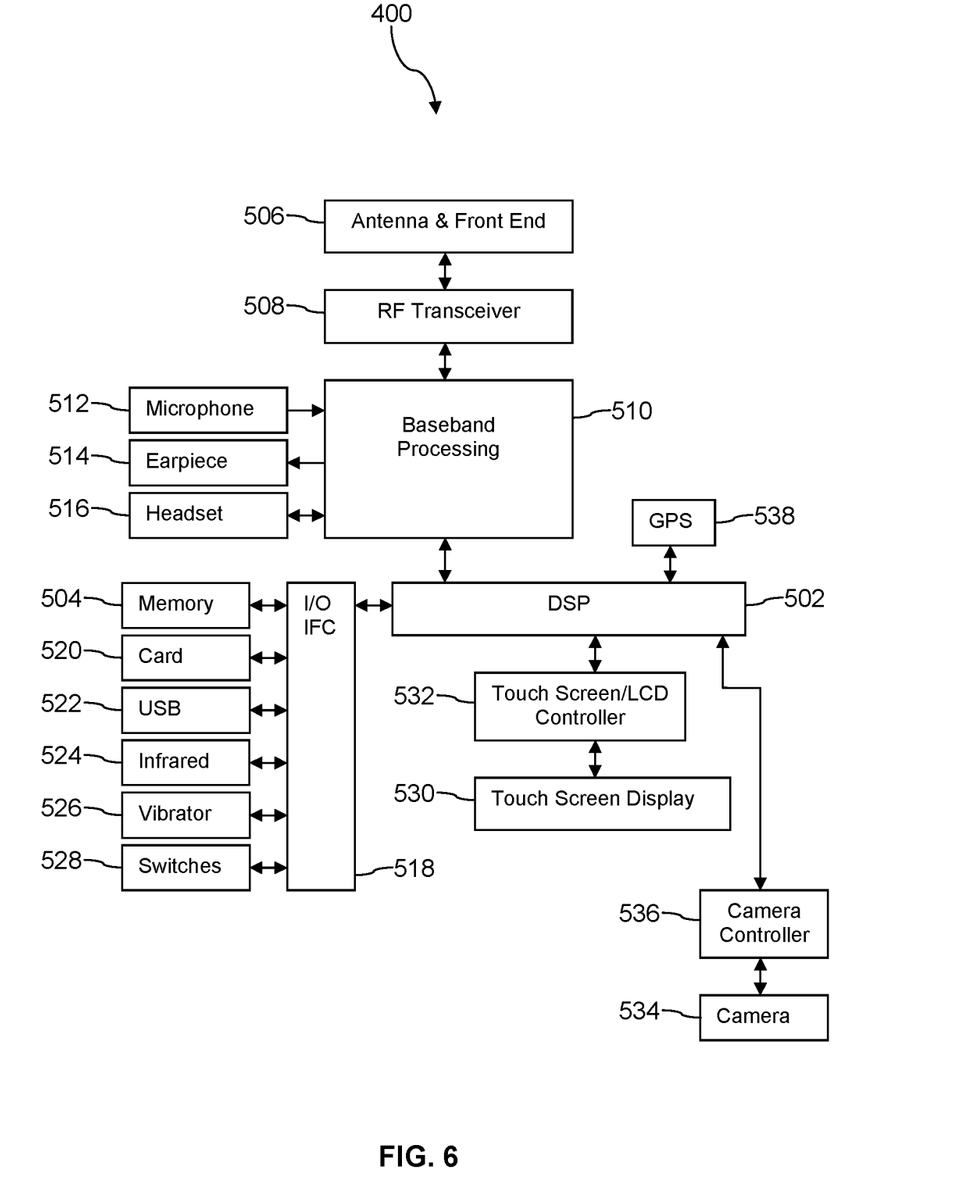
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
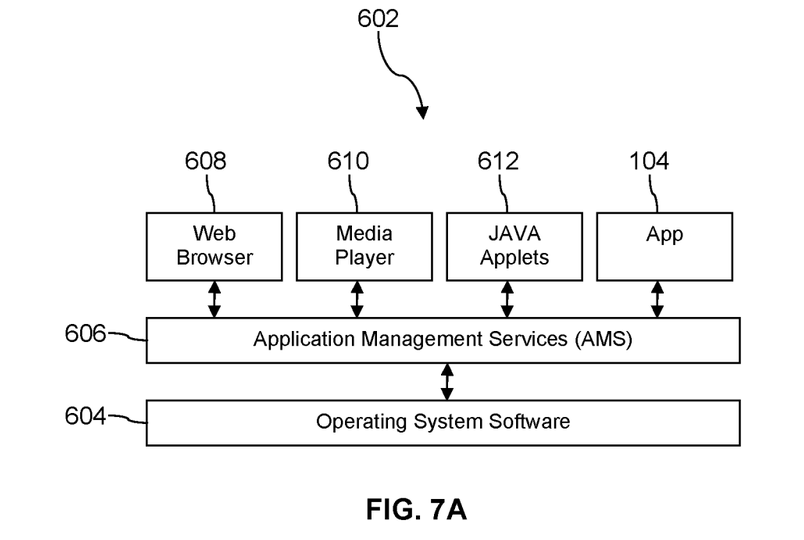
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
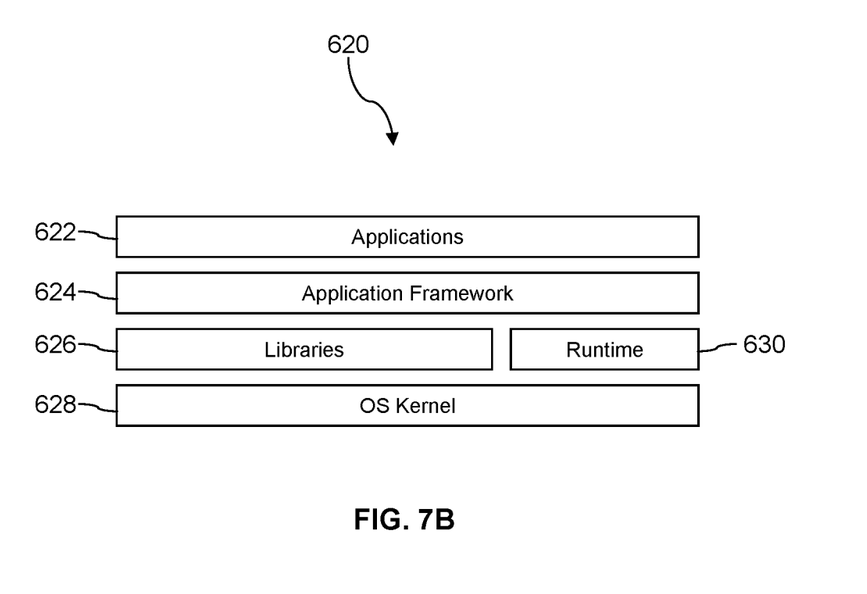
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
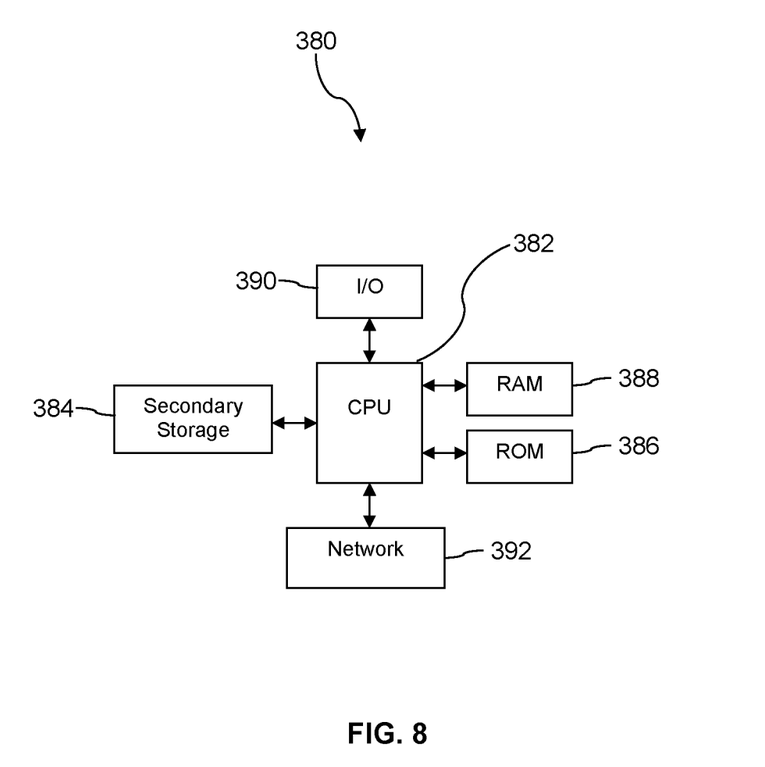
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

V/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing in-kind payment from a first wireless communication service account to a different wireless communication service account, comprising:

receiving information identifying cell sites from which a second mobile communication device customarily receives wireless service, wherein a cell site from which the second mobile communication device customarily receives wireless service is a cell site from which the second mobile communication device receives wireless service greater than a threshold percentage of time;

transmitting a silent short message service (SMS) from a first mobile communication device from a first wireless communication service account with a first wireless communication service provider that is associated with the first mobile communication device to the second wireless communication subscription service account with a second wireless communication service provider that is associated with a second mobile communication device to initiate an in-kind payment from the first mobile communication device to the second mobile communication device, the silent SMS configured to trigger the second mobile communication device to launch a client application executing on the second mobile communication device responsive to receipt of the silent SMS;

sending an in-kind payment verification request message from a client application executing on the first mobile communication device to the client application executing on the second mobile communication device;

receiving an in-kind payment verification response message by the client application executing on the first mobile communication device from the client application executing on the second mobile communication device, where the response message comprises an indication of a cell site from which the second mobile communication device is receiving wireless service and an indication of completion of an in-kind payment to the second wireless communication service account;

analyzing by the client application executing on the first mobile communication device the indication of the cell site from which the second mobile communication device is receiving wireless service and the indication of completion of the in-kind payment to the second wireless communication service account;

determining that the cell site from which the second mobile communication device is receiving wireless service is among the cell sites from which the second mobile communication device customarily receives wireless service; and verifying the in-kind payment as being authorized responsive to the cell site from which the second mobile communication device is receiving wireless service being determined as among the cell sites from which the second mobile communication device customarily receives wireless service.

2. The method of claim 1, wherein the first mobile communication device is one of a mobile phone, a smart phone, a personal digital assistant (PDA), a headset computer, a wearable computer, a laptop computer, a notebook computer, or a tablet computer.

3. The method of claim 1, wherein the first mobile communication device is provided a wireless communication link by the first wireless communication service provider according to a long term evolution (LTE), a code division multiple access (CDMA), a global system for mobile communication (GSM), or a worldwide interoperability for microwave access (WiMAX) wireless communication protocol.

4. The method of claim 1, wherein the in-kind payment verification request message comprises an indication of a value amount of in-kind payment.

5. The method of claim 1, wherein the second wireless communication service provider operates in a different country from the country in which the first wireless communication service provider operates.

6. A mobile communication device, comprising:
a processor;
a non-transitory memory;
a cellular radio transceiver; and
an in-kind payment client application stored in the non-transitory memory that, when executed by the processor,
receives information identifying cell sites from which a second mobile communication device customarily receives wireless service, wherein a cell site from which the second mobile communication device customarily receives wireless service is a cell site from which the second mobile communication device receives wireless service greater than a threshold percentage of time;
transmits a silent short message service (SMS) from a wireless communication service account with a first wireless communication service provider that is associated with the mobile communication device to a second wireless communication service account with a second wireless communication service provider that is associated with the second mobile communication device to initiate an in-kind payment from the first mobile communication device to the second mobile communication device, the silent SMS configured to trigger the second mobile communication device to launch a client application executing on the second mobile communication device responsive to receipt of the silent SMS;
sends an in-kind payment verification request message via the cellular radio transceiver to the client application executing on the second mobile communication device;
receives an in-kind payment verification response message from the client application executing on the second mobile communication device, where the response message comprises an indication of a cell site from which the second mobile communication device is receiving wireless service and an indication of completion of an in-kind payment to the second wireless communication service account;
analyzes the indication of the cell site from which the second mobile communication device is receiving wireless service and the indication of completion of the in-kind payment to the second wireless communication service account;
determining that the cell site from which the second mobile communication device is receiving wireless service is among the cell sites from which the second mobile communication device customarily receives wireless service; and
verifying the in-kind payment as being authorized responsive to the cell site from which the second mobile communication device is receiving wireless service being determined as among the cell sites from which the second mobile communication device customarily receives wireless service.

7. The mobile communication device of claim 6, where the mobile communication device is one of a mobile phone, a smart phone, a personal digital assistant (PDA), a headset computer, a wearable computer, a laptop computer, a notebook computer, or a tablet computer.

8. The mobile communication device of claim 6, wherein the cellular radio transceiver receives a wireless communication link according to a long term evolution (LTE), a code division multiple access (CDMA), a global system for mobile communication (GSM), or a worldwide interoperability for microwave access (WiMAX) wireless communication protocol.

9. The mobile communication device of claim 6, wherein the second wireless communication service provider operates in a different country from the country in which the first wireless communication service provider operates.

\* \* \* \* \*